INVENTOR
ROBERT C. ROLLETTE

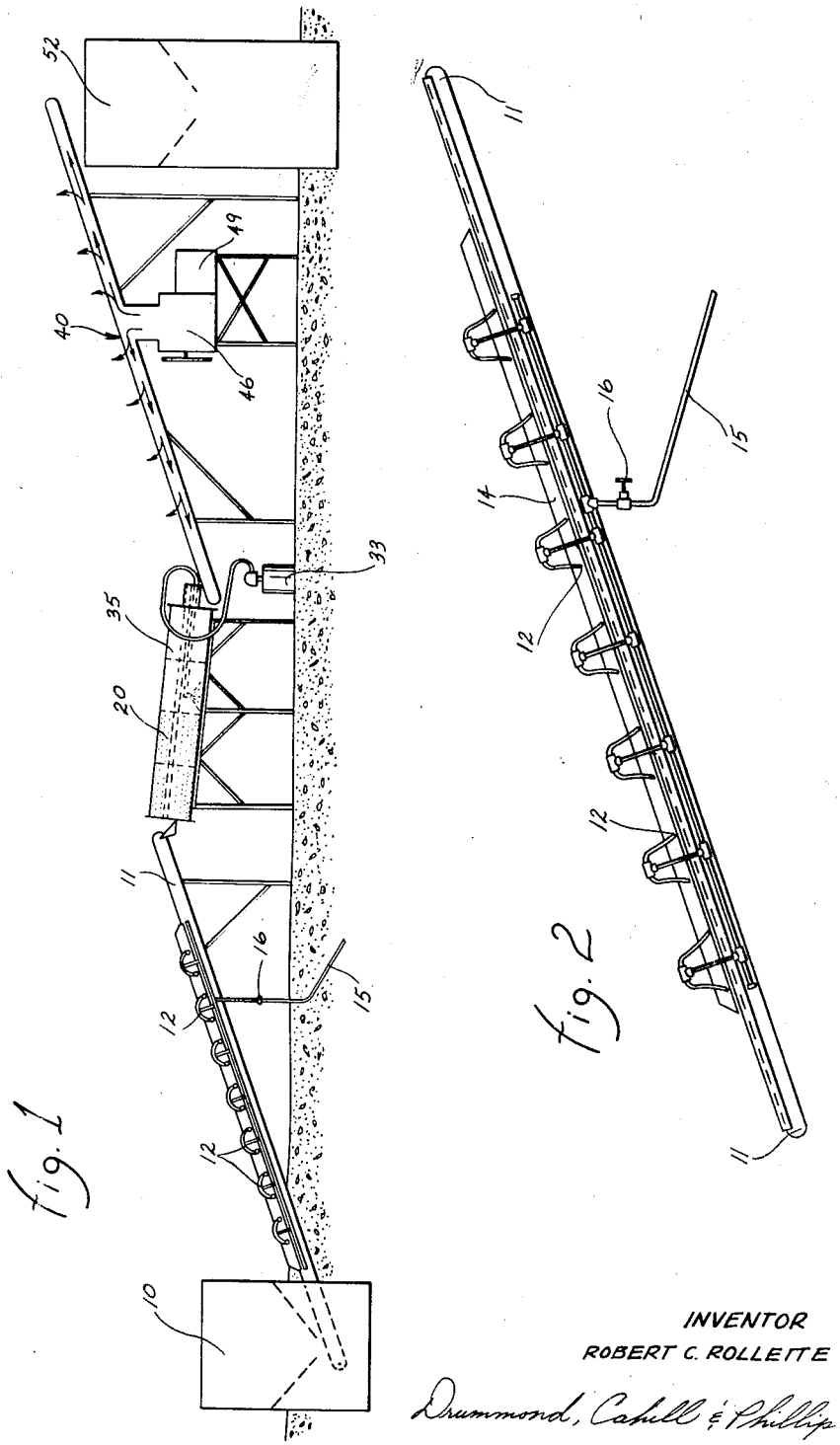

ATTORNEYS

April 21, 1970 R. C. ROLLETTE 3,507,249
APPARATUS FOR PRODUCING DECORATIVE STONE BY COATING
Filed June 11, 1969 4 Sheets-Sheet 3

INVENTOR
ROBERT C. ROLLETTE

Drummond, Cahill & Phillips
ATTORNEYS

INVENTOR
ROBERT C. ROLLETTE

ATTORNEYS

United States Patent Office 3,507,249
Patented Apr. 21, 1970

3,507,249
APPARATUS FOR PRODUCING DECORATIVE STONE BY COATING
Robert C. Rollette, 280 Blackhawk Blvd.,
South Beloit, Ill. 61080
Continuation-in-part of application Ser. No. 437,759, Mar. 8, 1965. This application June 11, 1969, Ser. No. 832,042
Int. Cl. B05c *11/12, 5/00*
U.S. Cl. 118—66         10 Claims

ABSTRACT OF THE DISCLOSURE

Stone to be coated is preheated and introduced into a rotating drum which includes therein a spray arrangement forming a spray pattern of coating material. As the drum rotates and the stone is tumbled, the stone falls through the spray pattern a number of times to become completely coated and is fed to a separate section of the drum to be dried. The stone is preheated on its way from a storage area to the drum and is dried on a conveyor after exiting from the drum during its travel to storage.

---

This application is a continuation-in-part of my co-pending application Ser. No. 437,759, filed Mar. 8, 1965, entitled "Method and Apparatus for Producing Decorative Stone."

My invention relates to an apparatus for producing decorative stone and to the decorative stone produced thereby, and more particularly, to an apparatus for producing decorative stone including means for coating.

Various colored particulate stones have won wide acceptance for use as roofing materials, as a substitute for grass lawns, for gardens or patios, or the like. The first use of decorative stones of this type involved the selection of various special mineral-containing stones which had a particular desirable or pleasing color. When it became apparent that the variety of colors and the amount of stone for certain colors was limited, it was proposed to paint or color any type of stone so as to give it the desired appearance. For instance, green-colored stone has won wide acceptance as a substitute for grass lawns, particularly in the soutwest portion of the United States.

In the Southwest and certain other portions of the United States, strong sunlight is an environmental factor which tends to fade or otherwise degrade coating compositions employed to color stone. Sustained high temperatures as well as the direct effects of sunlight are also significant. In other portions of the country, moisture tends to be a problem in the degradation of the coating material employed. Consequently, most coating materials developed for use with decorative stone are developed with a view to solving the problems raised by environmental conditions.

Heretofore, a decorative stone has lacked uniformity in color and coating thickness. Many of the coatings previously applied were thin and were easily deteriorated through abrasion due to handling or the like. Many organizations, in order to avoid overly-thin coatings, tended to overcoat their stone. While these coatings certainly covered all parts of the stone, there was little control over the thickness and color of the coat applied and was of necessity a very wasteful practice. Further, in the previously known coating methods and apparatus, a given batch of stone passed through a coating process could have some stone which was very thinly coated and other stone which had received an overly heavy coat of coloring materials.

Along with uniformity of coating thickness and color, coating texture is significant. The preferred coating finish or texture is a uniformly dull, substantially non-reflective coating. Previously known methods of coating stone for decorative purposes had, among their other disadvantages, the property of producing undesirable shiny or glazed-appearing colored stone.

Accordingly, it is an object of my invention to provide a decorative coated stone having a uniform coating.

Another object of my invention is to provide a method and apparatus for producing uniformly coated decorative stone.

Other objects and advantages will become apparent to those skilled in the art in the course of the following specification and claims when taken in light of the accompanying drawings.

I have discovered a method of producing uniformly coated, uniformly colored decorative stone. In accordance with my method, and using my apparatus, I first heat the uncoated particulate stone to a temperature of from about 100° F. to about 200° F. Heated particulate stone is then introduced to a coating chamber where it is tumbled. In the coating chamber, a water-base coating material is applied to the heated stone. After coating, the stone is removed from the coating chamber, further tumbled, and dried, thereby to produce a uniformly coated, uniformly decorative stone product.

A better understanding of my invention may be obtained in light of the accompanying drawings, in which:

FIGURE 1 is an elevation illustrating the relationship of the various elements of my apparatus.

FIGURE 2 is an elevation of a heated conveyor in accordance with my invention.

Figure 3:
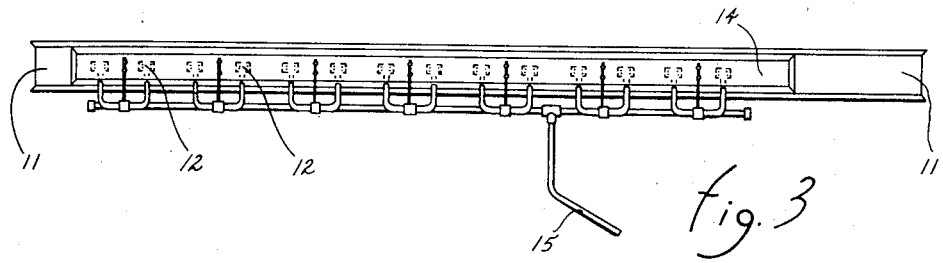
FIGURE 3 is a plan view of a heated conveyor in accordance with my invention.

Referring to the drawings, and particularly to FIGURES 1–3, stone is fed from a hopper 10 onto a moving belt type of conveyor 11. The stone may have been previously graded, if desired, and it is preferred that the stone have a size sufficient to be retained on a ¼ inch screen and pass a ¾ inch screen. The conveyor belt 11 is of a heat-resistant material, and preferably is a wire mesh type of belt. As the stone is carried upward by the conveyor belt 11, the stone on the conveyor belt passes under a plurality of gas burners 12, thereby raising the temperature of the stone to the desired level. A shield 14 may be employed to cover the burners and, if desired, support them. The main purpose of the shield is to deflect heat downward onto the stone and thereby increase the heating efficiency of the burners. Each burner may be controlled so that one or all burners may be employed if desired. I prefer to feed all my gas burners 12 from a main gas line 15 having a main gas control valve 16 so that I may shut off all burners at once, if desired.

Figure 4:
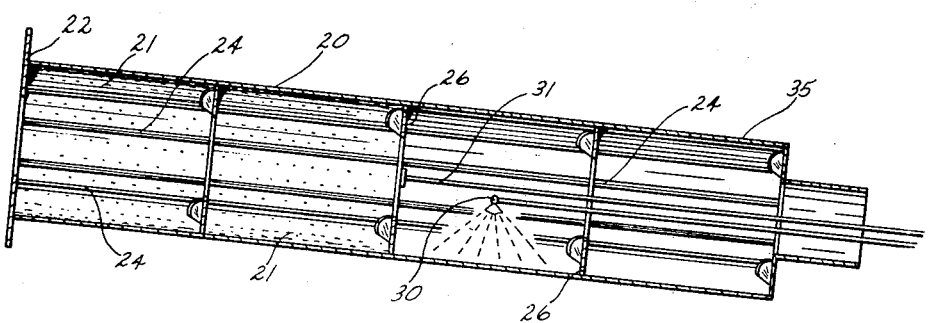
FIGURE 4 is an elevation, partially in section, illustrating details of the rotating drum portion of my apparatus.
Figure 5:
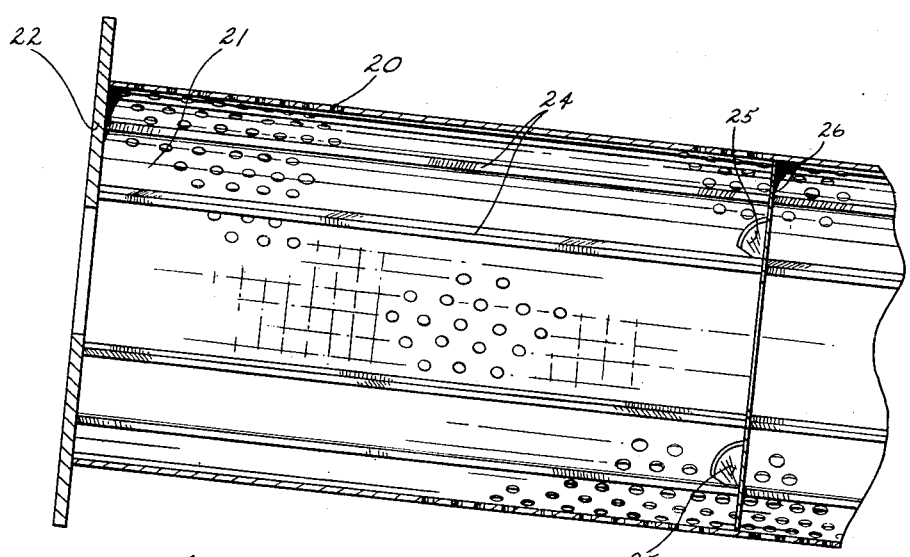
FIGURE 5 is a partial elevation, partially in section, illustrating a portion of the drum portion illustrated in FIGURE 4.
Figure 8:
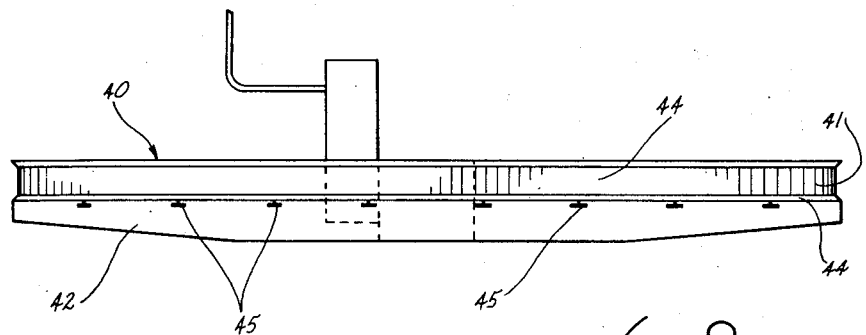
FIGURE 8 is a plan view illustrating the drying portion of my apparatus.
Figure 9:
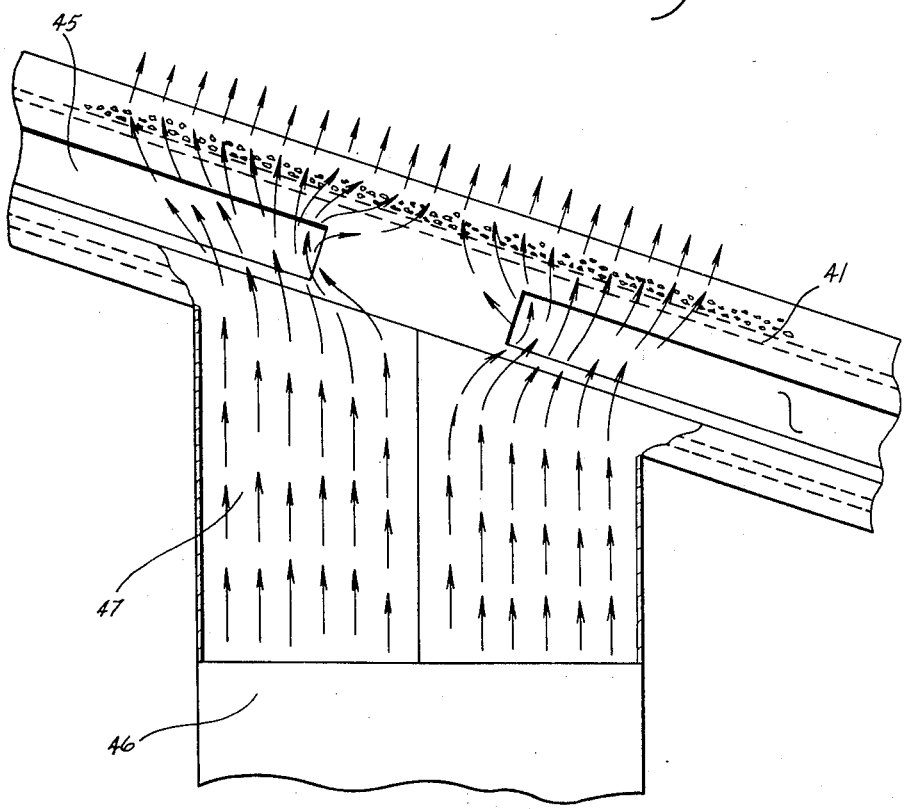
FIGURE 9 is an enlarged partial sectional elevation illustrating details of the drying portion of my apparatus.

Stone from the heater-conveyor is discharged into the rotating drum portion of my apparatus. Referring particularly to FIGURES 1 and 4–6, heated stone enters approximately at the center of the left-hand portion of my rotating drum 20. My rotating drum is approximately 16 feet in length and is broken into four sections of approximately equal length. The two left-hand portions of my rotating drum are substantially identical and have a perforated exterior skin 21 as shown in FIGURES 4 and 5. A stationary running lip 22 provides support and guidance for the left end of the rotating drum. As may be seen from FIGURE 1, rotating drum 20 is inclined slightly downwardly to the right as will be explained more fully later. Stone enters the first or left-hand section of the rotating drum and fine materials pass through the perforations 21. The perforated portion of the rotating drum 20 is not required unless the stone raised by the conveyor has an unduly large amount of fines included with it. Stone in the rotating drum is lifted by stone carriers 24 which are substantially rectangular ribs, parallel to the longitudinal axis of the drum and extending from the outer surface of the drum toward its center. As the drum 20 rotates, the carriers 24 pick up a portion of the stone and carry it upwardly substantially along the periphery of the drum. When a carrier reaches a height such that its angle is too great to carry the stone, the stone falls to the bottom of the drum. Thus, a tumbling action is imparted to the stone. Because of the downward tilt of the drum toward the right, the stone is caused to move toward the right as it is lifted and tumbled within the drum. In this manner, the stone is passed through the drum. When the stone reaches the right-hand sides of its respective drum section, lifters 25 channel the stone through a central aperture in the section divider 26. The tumbling action is imparted to the stone in substantially the same manner in all four of the sections of the rotating drum illustrated in the drawings.

Figure 6:
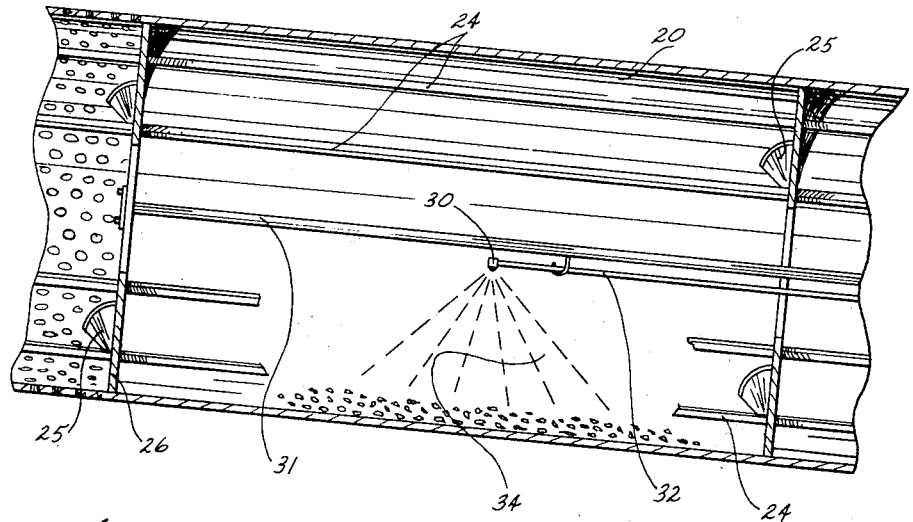
FIGURE 6 is a partial elevation, partially in section, illustrating the spraying area within the drum portion of my apparatus.
Figure 7:
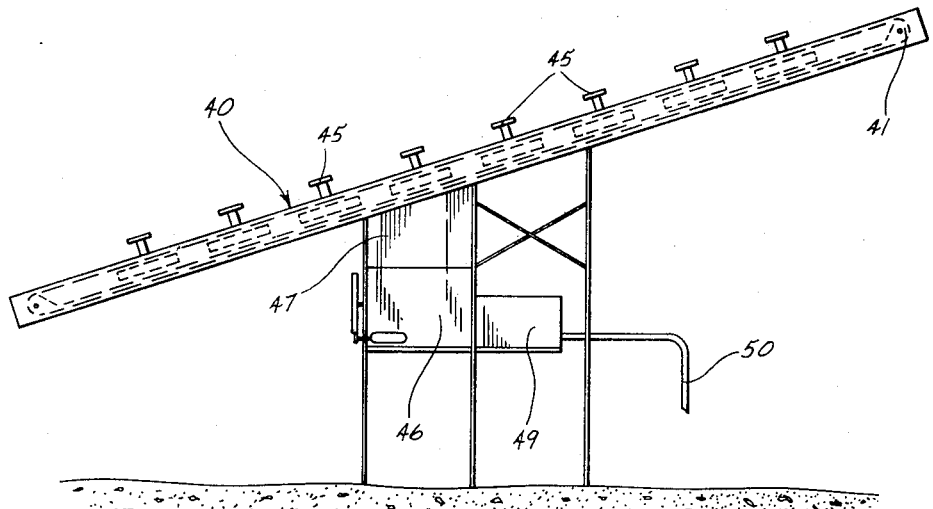
FIGURE 7 is an elevation illustrating the drying portion of my apparatus.

When the stone has passed through the perforated sections of the drum, the stone is channeled onto the spraying section. In construction, the spraying section is substantially the same as the perforated section except that its outer or peripheral surface is imperforate. Referring particularly to FIGURES 4 and 6, spraying means 30 is positioned near the central axis of the spraying section or chamber of the rotating drum. Suitable means such as a retaining bar 31 are employed to support the required plumbing 32 which serves the spray means. A pump 33 provides spray pressure. For uniformity in spray rate and pressure, I prefer to use a positive displacement pump adapted to minimize pulsation. Typical of such pumps are the Grayco "President" series of power flow hydra-spray pumps. The pump employed in the embodiment shown applies 28 pounds per square inch pressure at the spray nozzle for each pound of pressure applied at the pump. As spray means 30, I prefer to employ a nozzle which forms a spray pattern 34 which extends about ½ the length of the spraying section, and has a width of from about 2 to about 6 inches. By adjusting the angle of the rotating drum 20 and the rate of rotation thereof, I prefer to control the linear rate of passage of stone through the drum so that each particular piece of stone passes through the spray pattern from about 3 to about 5 times and is tumbled between each successive passage therethrough.

When the stone has passed through the spraying portion of the drum, lifters 25 introduce the coated stone into a tumbler section 35 which is of substantially the same construction as the spraying section. The stone passes through the tumbling section, which may also be referred to herein as the predrying section, and is removed therefrom by lifters and channeled onto a drying conveyor means generally designated 40. The stone is distributed on the drying conveyor means to effectively form a moving bed.

Referring to FIGURES 7–9, and 1, the drying conveyor means 40 comprises a porous belt 41 having a plenum 42 along one side thereof. Preferably, the porous belt is of a heat resistant material such as wire mesh. Suitable shielding 44 is provided whereby air which is introduced through the plenum 42 is forced through the operative portion of the porous belt 41 and the bed of coated stone carried thereby. Adjustable air-control doors 45 are provided so that air may be directed to or excluded from any desired portion of the porous moving belt 41 in any desired amount. Air is forcibly introduced to the plenum 42 by a blower 46 and suitable duct work 47. Where ambient temperatures are below the desired drying temperature, heating of the forced air may be required. A gas burner 49, which is supplied by gas line 50, is suitably provided. Dried coated stone is discharged from the end of the drying conveyor into a hopper 52 but may be discharged directly into a truck or like conveyance.

When stone is coated in accordance with my invention, the stone has a coating which I refer to as a "double coat." In explaining what I mean by the term "double coat," an analogy may be drawn from everyday experience in house painting or the like. Ordinarily, a first or single coat is not sufficient to cover a painted surface so as to mask the features of coloring beneath the first coat of paint. Consequently, after the first coat has been applied and permitted to dry, a second coat is applied to complete the painting job. When the method of my invention is correctly practiced, a "double coat" of coating material is applied to the stone in a single operation without an intermediate drying step. In general, a double coat in accordance with my invention is just thick enough to provide adequate coverage of the stone substrate material without being excessive.

As hereinbefore stated, I prefer to heat my stone to a temperature of from about 100° Fahrenheit to about 200° Fahrenheit prior to coating. When temperatures less than 100° Fahrenheit are employed, a coating resembling a single coat is obtained which does not mask the basic substrate coloring completely. When temperatures greater than about 200° Fahrenheit are employed, a glazed surface may appear and, in addition, windows may appear in the coating.

Heating of the stone may be accomplished by any desirable means, and may be combined with a transportation step if desired. I generally prefer to pre-grade or pre-size my stone so as to operate my process with a uniformly-sized stone. The grading may occur before, during, or after the heating step, or at any combination thereof. While I prefer to employ a substantially uniformly sized stone in my process, this is not essential. Stone may be screened to remove undesirable fine material, dust or the like employing a perforated drum section or by pre-screening whether the stone is graded or not. Usually, I operate my process with stone not greater than ¾ inch in diameter.

The coating chamber used in accordance with my process may be of any size, shape, or design which will impart a tumbling action to the stone particles during coating. I prefer to use a drum having internal carriers and lifters such as illustrated in the drawings for this purpose.

Coating is preferably accomplished by spraying a water-base coating composition onto the stone particles as they are tumbled in an pass through the coating chamber. To this end, I provide spraying means which sprays in a somewhat restricted portion of the coating chamber which I refer to as the "spray pattern" or "coating zone." I arrange my coating chamber so that each stone particle passes through the coating zone from about three to about five times during its passage through the coating chamber.

Water-base coating compositions in accordance with my invention are mixtures of water with a coating formulation. I prefer to employ water-base coating compositions having a volume ratio of coating formulation to water of from about 0.8:1 to about 1.5:1.

Water is added to the coating formulation to thin the formulation and to cause it to spread uniformly. Too little water results in an overly-thick, uneven coating in certain portions of the stone with windows occurring at other portions of the coated stone. Excessive water results in a coat which is thin and does not properly mask a basic substrate coloring and is less than a "double coat." A further complication which occurs when too much water is present is that the coating is difficult to dry without drastically altering the apparatus in use. I have discovered after long experimentation, that the desired phenomenon is that the coating dry from the inside with the outer portion of the coating being dried last. If the outside of the coating or the skin of the coating dries first, it is difficult to remove water from the balance of the coating without excessive temperatures and a possible degradation of the coating material or unevenness in the coating. This apparently is one of the reasons why heating of the stone is essential and a preliminary to the coating step. Some of the heat in the stone apparently starts to drive off water from the water-base coating composition at the inside of the coating and the balance of the water is removed during the actual drying step.

I have found that the best coatings may be obtained when the water-base coating composition is sprayed or otherwise applied at a temperature of from about 80° Fahrenheit to about 100° Fahrenheit. Adjustments may be made to obtain these preferred temperatures by controlling the temperature of the water mixed with the coating formulation. I have also found that excellent, uniform double coatings of the stone may be obtained at an application rate of from about two and one-half to about three gallons of coating formulation per ton of stone coated when the stone is of the standard ⅜ inch size. More or less coating formulation may be necessary with different average sizes of stone since different surface areas will likely be involved.

Coating formulations useful in accordance with my invention are those which are environmentally suitable, when dried or cured, for use with decorative stone. Typical coating compositions in accordance with my invention contain pigments, certain colloidal elements or materials, polymeric materials such as emulsions or the like, extenders, water, and may contain various well-known dispersants, surfactants or the like.

A preferred class of coating formulation generally contain from about 25 to about 45 percent by weight of a thickener, from about 15 to about 25 weight percent of an extender, from about 1 to about 2 percent by weight of a pigment, from about 0.3 to about 0.8 percent by weight of one or more anionic dispersants, from about 0.6 to about 1.2 percent by weight of non-ionic surface active agents, from about 5 to about 15 percent by weight of water and from about 3 to about 5 percent by weight of miscellaneous additives.

Typical of the thickeners appropriate for use in accordance with my invention are the colloidal solutions of methyl cellulose, carboxy methyl celluose, hydroxy propyl methyl cellulose, hydroxy ethyl cellulose, or the like, containing from about 1 to about 2½ percent water.

Polymeric emulsions particularly suitable for use in accordance with my invention contain from about 45 to about 65 weight percent solids comprising vinyl acetate monomer modified with one or more of dibutyl fumarate, dibutyl maleate, 2-ethyl hexyl acrylate, or the like, and the balance being water.

Any desirable extender may be employed in the coating formulations of my invention, but I have found that chromium oxide is particularly well suited.

Pigments useful in the coating formulation of my invention are those which provide the desired coloring and are resistant to fading under direct sunlight, extreme moisture, or the like. Typical examples of suitable pigments in accordance with my invention are titanium dioxide, phthalocyanine green, phthalocyanine blue, carbon black, or the like, depending on the desired color.

I have found that dispersants such as potassium tripolyphosphate, potassium tetra pyrophosphate, sodium salt of polymeric carboxylic acid, or the like are particularly well suited for my invention, but any of the well-known pigment dispersants may be employed.

Any of the suitable non-ionic surface active agents generally employed in paint or coating formulations are suitable for use in my invention, but I prefer to use the condensation products of octyl or nonyl phenol with ethylene oxide. When these condensation products are employed, I prefer that the condensations be in the ratio of from about 1 mole of phenol to from about 5 to about 12 moles of ethylene oxide.

Typical miscellaneous additives which I may employ are ethylene glycol and propylene glycol. I may also add a preservative such as phenyl mercury acetate, oleate, succinate or the like. I may also add anti-foaming agents such as coconut fatty acids and various well-known proprietary mixtures.

Following application of the water-base coating composition to the stone, the coated stone is further tumbled out of the influence of the spray pattern for a time approximately equal to the time tumbled in the coating chamber. This pre-drying step apparently aids in the distribution of the coating formulation over the surface of the stone and permits the residual heat in the stone to drive off some of the water contained in the water-base coating composition. A preferred method of accomplishing this predrying step is illustrated in the accompanying drawings wherein a separate chamber in the form of an extension to the coating chamber is employed.

After the predrying step, the coated stone is dried or cured. I prefer to dry my coated stone by forming a thin bed thereof and passing heated gas, preferably air, therethrough. A preferred apparatus is illustrated in the accompanying drawings, particularly in FIGURES 1 and 7–9. The temperature of the drying air may be from about 75 degrees Fahrenheit up to the maximum temperature the coating will stand without being adversely affected. For best results, I prefer a temperature of from about 75 degrees Fahrenheit to about 150 degrees Fahrenheit. The actual temperature employed will, of course, depend significantly on the humidity of the available air or other gas and the amount of water in the water-base coating composition which remains on the stone leaving the predrying chamber. If the humidity of the available drying gas is high or the amount of water remaining on the stone is higher than usual, or both, the drying gas temperature must be raised appropriately in order to adequately dry the coated stone and maintain the same rate of production with the same equipment. I also may prefer to adjust the rate of gas flow through the bed of coated stone so that the volume of drying gas per square foot of stone increases as the stone approaches the discharge end of the conveyor belt. This is readily accomplished by adjusting the air control doors 45. Obviously, the temperature of the drying air could remain the same if the time period of the drying step were extended, or if the equipment were enlarged.

The following examples are set forth for further illustration and amplification and are not to be construed to limit my invention.

EXAMPLE I

Employing the apparatus herein described, stone having an average size of ⅜ inch diameter may be coated. Stone is fed to the heater conveyor at a rate of about 6 tons per hour. Water-base coating composition is sprayed onto the stone in the coating chamber at a rate of about ½ gallon per minute at a temperature of from about 80 to about 100 degrees Fahrenheit. In the drier-conveyor section of my apparatus, the blower delivers 22,000 cubic feet of air per minute and the total exposed drying belt area is 40 square feet. All the apparatus is run at steady state, i.e., 6 tons of stone per hour are fed to the apparatus and 6 tons of coated stone are removed therefrom.

Coating formulations containing from about 25 to about 45 percent by weight of a cellulosic thickener such as colloidal solutions of methyl cellulose, carboxy methyl cellulose, hydroxy propylmethyl cellulose or hydroxy ethyl cellulose, or mixtures thereof, and from about 1 to about 2½ percent water; from about 25 to about 40 percent by weight of a polymeric emulsion containing from about 45 to about 65 percent by weight solids and the balance water, said solids comprising vinyl acetate monomer modified with one or more of dibutyl fumarate, dibutyl maleate, or 2-ethyl hexyl acrylate; from about 15 to about 25 percent by weight of chromium oxide extender; from about one to about two percent by weight of pigment; from about 0.3 to about 0.8 percent by weight of one or more anionic dispersants such as potassium tripoly phosphate, potassium tetra pyrophosphate, or sodium salt of polymeric carboxylic acid; from about 0.6 to about 1.2 percent by weight of one or more nonionic surface active agents such as the condensation products of octyl or nonyl phenol with ethylene oxide, said condensation products in the ratio of from about 1 mole of phenol to from about 5 to about 12 moles of ethylene oxide; from about 3 to about 5 percent by weight of miscellaneous additives permissably including ethylene glycol, propylene glycol, preservative agents such as phenyl mercury acetate, phenyl mercury oleate, or phenyl mercury succinate, and anti-foaming agents such as coconut fatty acids or other well-known proprietary mixtures; and from about 5 to about 15 percent by weight of water are employed.

In tabular form various conditions of temperature, humidity and water content are set forth to illustrate conditions under which successful double coatings are obtained under the conditions hereinabove specified. For purposes of this example, stone remains in the predrying stage for a period of one minute and travels on the conveyor belt in the drying section for approximately two minutes.

TABLE

| Coating run | I | II | III | IV | V | VI | VII |
|---|---|---|---|---|---|---|---|
| Stone temp. (°F.) | 100 | 125 | 150 | 175 | 200 | 150 | 150 |
| Ambient air temp. (°F.) | 70–75 | 70–75 | 70–75 | 70–75 | 70–75 | 50 | 100 |
| Coating composition vol. formulation (vol. $H_2$) | 25/18 | 25/20 | 25/22.5 | 25/25 | 25/27 | 25/22.5 | 25/22.5 |
| Drying air temp. (°F.) | 150 | 150 | 125 | 100 | 75 | 150 | 125 |
| Humidity (percent) | 30 | 40 | 50 | 60 | 70 | 50 | 50 |

Coatings obtained are uniform double coats and have a dull, substantially non-reflective texture.

The various temperatures, humidities, and ratios of coating formulation to water may be varied within the ranges herein set forth in this specification with substantially similar excellent results.

EXAMPLE II

Coating formulations which are environmentally suited to the use for which the stone is intended and which are not degraded by the stone and drying air temperatures may be substituted for the formulations set forth in Example I with substantially the same resultant coatings.

Various modifications may be made in my invention without departing from the spirit or scope thereof, and it is to be understood that I limit myself only as defined by the appended claims.

I claim:
1. Apparatus for producing decorative stone comprising:
  (a) heated conveyor means,
  (b) drum means oriented to receive particulate stone from said conveyor means,
  (c) means within said drum means whereby said stone is tumbled and passed through said drum means,
  (d) spray means oriented to provide a spray pattern within said drum means, and
  (e) drying means, said drying means comprising
    (1) a porous conveyor belt adapted to receive stone from said drum means,
    (2) blower means, and
    (3) plenum and shielding means communicating between said blower means and said porous belt whereby air from said blower means is forced through said porous belt.

2. Apparatus for producing decorative stone comprising in combination:
  (a) heated conveyor means,
  (b) said heated conveyor means comprising a heat-resistant moving belt means and heating means positioned spaced above said belt means,
  (c) drum means oriented to receive particulate stone from said conveyor means,
  (d) means within said drum means whereby said stone is tumbled and passed through said drum means,
  (e) spray means oriented to provide a spray pattern within said drum means, and
  (f) drying means, said drying means comprising
    (1) a porous conveyor belt adapted to receive stone from said drum means,
    (2) blower means, and
    (3) plenum and shielding means communicating between said blower means and said porous belt whereby air from said blower means is forced through said porous belt.

3. Apparatus for producing decorative stone comprising in combination:
  (a) heated conveyor means,
  (b) said heated conveyor means comprising a wire mesh moving belt means and gas burners positioned spaced above said wire mesh belt means,
  (c) drum means oriented to receive particulate stone from said conveyor means,
  (d) means within said drum means whereby said stone is tumbled and passed through said drum means,
  (e) spray means oriented to provide a spray pattern within said drum means, and
  (f) drying means, said drying means comprising
    (1) a porous conveyor belt adapted to receive stone from said drum means,
    (2) blower means, and
    (3) plenum and shielding means communicating between said blower means and said porous belt whereby air from said blower means is forced through said porout belt.

4. Apparatus for producing decorative stone comprising in combination:
  (a) heated conveyor means,
  (b) drum means oriented to receive, particulate stone from said conveyor means,
  (c) means within said drum means whereby said stone is tumbled and passed through said drum means,
  (d) a spraying chamber defined by said drum means,
  (e) spray means oriented to provide a spray pattern within said spraying chamber, and
  (f) drying means, said drying means comprising
    (1) a porous conveyor belt adapted to receive stone from said drum means,
    (2) blower means, and
    (3) plenum and shielding means communicating between said blower means and said porous belt whereby air from said blower means is forced through said porous belt.

5. Apparatus for producing decorative stone comprising in combination:
  (a) heated conveyor means, (b) drum means oriented to receive particulate stone from said conveyor means,
(c) means within said drum means whereby said stone is tumbled and passed through said drum means,
(d) said drum means defining a perforated portion, a spraying chamber, and a predrying section,
(e) spray means oriented to provide a spray pattern within said spraying chamber, and
(f) drying means, said drying means comprising
 (1) a porous conveyor belt adapted to receive stone from said drum means,
 (2) blower means, and
 (3) plenum and shielding means communicating between said blower means and said porous belt whereby air from said blower means is forced through said porous belt.

6. Apparatus for producing decorative stone comprising in combination:
(a) heated conveyor means,
(b) drum means oriented to receive particulate stone from said conveyor means,
(c) means within said drum means whereby said stone is tumbled and passed through said drum means,
(d) said drum means defining a perforated portion, a spraying chamber, and a predrying section, said spraying chamber and predrying section having substantially the same size,
(e) spray means oriented to provide a spray pattern within said spraying chamber, and
(f) drying means, said drying means comprising
 (1) a porous conveyor belt adapted to receive stone from said drum means,
 (2) blower means, and
 (3) plenum and shielding means communicating between said blower means and said porous belt whereby air from said blower means is forced through said porous belt.

7. Apparatus for producing decorative stone comprising in combination:
(a) heated conveyor means,
(b) drum means oriented to receive particulate stone from said conveyor means,
(c) means within said drum means whereby said stone is tumbled and passed through said drum means,
(d) spray means oriented to provide a spray pattern within said drum means, and
(e) drying means, said drying means comprising
 (1) a porous heat-resistant conveyor belt adapted to receive stone from said drum means,
 (2) blower means, and
 (3) plenum and shielding means communicating between said blower means and the operative portion of said porous belt whereby air from said blower means is forced upwardly through said porous belt.

8. Apparatus for producing decorative stone comprising in combination:
(a) heated conveyor means,
(b) drum means oriented to receive particulate stone from said conveyor means,
(c) means within said drum means whereby said stone is tumbled and passed through said drum means,
(d) spray means oriented to provide a spray pattern within said drum means, and
(e) drying means, said drying means comprising
 (1) a wire mesh conveyor belt adapted to receive stone from said drum means,
 (2) blower means, and
 (3) plenum and shielding means, including adjustable air-control doors communicating between said blower means and the operative portion of said wire mesh belt whereby air from said blower means is forced upwardly through any desired portion of said belt.

9. Apparatus for producing decorative stone comprising in combination:
(a) heated conveyor means,
(b) drum means oriented to receive particulate stone from said conveyor means,
(c) means within said drum means whereby said stone is tumbled and passed through said drum means,
(d) spray means oriented to provide a spray pattern within said drum means, and
(e) drying means, said drying means comprising
 (1) a wire mesh conveyor belt adapted to receive stone from said drum means,
 (2) blower means,
 (3) plenum and shielding means, including adjustable air-control doors, communicating between said blower means and the operative portion of said wire mesh belt whereby air from said blower means is forced upwardly through any desired portion of said belt, and
 (4) heating means whereby said air may be raised to the desired drying temperature.

10. Apparatus for producing decorative stone comprising in combination:
(a) heated conveyor means,
(b) said heated conveyor means comprising a wire mesh moving belt means and a plurality of gas burners positioned spaced above said wire mesh belt means,
(c) drum means oriented to receive particulate stone from said conveyor means,
(d) carrier and lifter means within said drum means whereby said stone is tumbled and passed through said drum means,
(e) said drum means defining a perforated portion, a spraying chamber, and a predrying section, said spraying chamber and predrying section having substantially the same size,
(f) spray means oriented to provide a spray pattern within said spraying chamber, and
(g) drying means, said drying means comprising
 (1) a wire mesh conveyor belt adapted to receive stone from said drum means,
 (2) blower means,
 (3) plenum and shielding means, including adjustable air-control doors, communicating between said blower means and the operative portion of said wire mesh belt whereby air from said blower means is forced upwardly through any desired portion of said belt, and
 (4) heating means whereby said air may be raised to the desired drying temperature.

References Cited

UNITED STATES PATENTS

| | | | | |
|---|---|---|---|---|
| 2,601,355 | 6/1952 | Wyss et al. | 118—303 X |
| 2,639,269 | 5/1953 | Dube | 118—303 X |
| 3,399,506 | 9/1968 | Howe | 34—216 X |

WALTER A. SCHELL, Primary Examiner

J. P. McINTOSH, Assistant Examiner

U.S. Cl. X.R.

118—303